(12) United States Patent
Anholt et al.

(10) Patent No.: US 7,912,140 B2
(45) Date of Patent: Mar. 22, 2011

(54) REDUCING COMPUTATIONAL COMPLEXITY IN MAXIMUM LIKELIHOOD MIMO OFDM DECODER

(75) Inventors: Micha Anholt, Tel Aviv (IL); Eran Gerson, Pardes Hana (IL); Koby Vainapel, Herzeliya (IL)

(73) Assignee: Lantiq Israel Ltd., Yakum (IL)

( * ) Notice: Subject to any disclaimer, the term of this patent is extended or adjusted under 35 U.S.C. 154(b) by 927 days.

(21) Appl. No.: 11/690,966

(22) Filed: Mar. 26, 2007

(65) Prior Publication Data

US 2008/0240277 A1    Oct. 2, 2008

(51) Int. Cl.
*H04L 23/02* (2006.01)
(52) U.S. Cl. ........ 375/262; 375/267; 375/316; 375/347; 375/349; 375/340; 714/794; 714/795
(58) Field of Classification Search .......... 375/262, 375/267, 316, 347, 349, 340, 341; 714/794, 714/795
See application file for complete search history.

(56) References Cited

U.S. PATENT DOCUMENTS

| | | | | |
|---|---|---|---|---|
| 6,529,559 | B2 * | 3/2003 | Reshef | 375/262 |
| 7,277,506 | B1 * | 10/2007 | Pope et al. | 375/341 |
| 7,451,173 | B1 * | 11/2008 | Van Benthem et al. | 708/607 |
| 2005/0249302 | A1 | 11/2005 | Leshem et al. | 375/267 |
| 2006/0029162 | A1 * | 2/2006 | Chi | 375/340 |
| 2006/0092882 | A1 | 5/2006 | Ghosh et al. | 370/332 |
| 2006/0182207 | A1 * | 8/2006 | Lee et al. | 375/347 |
| 2007/0009057 | A1 * | 1/2007 | Ito | 375/262 |
| 2008/0137763 | A1 * | 6/2008 | Waters et al. | 375/260 |
| 2009/0190683 | A1 * | 7/2009 | Awater et al. | 375/262 |
| 2010/0040180 | A1 * | 2/2010 | Kim et al. | 375/348 |

FOREIGN PATENT DOCUMENTS

GB     2427106     12/2006

OTHER PUBLICATIONS

Ghosh et al, "Reduced complexity ML Detection for Coded MIMO System Using Absolute-Value Search," published in Intl Conf on Acoustics, Speech and Signal Processing, 2005, vol. 3, pp. 1025-1028.

* cited by examiner

*Primary Examiner* — Chieh M Fan
*Assistant Examiner* — Siu M Lee
(74) *Attorney, Agent, or Firm* — Martin Fleit; Paul D. Bianco; Fleit Gibbons Gutman Bongini & Bianco PL

(57) ABSTRACT

A method and a system for reducing computational complexity in a maximum-likelihood MIMO decoder, while maintaining its high performance. A factorization operation is applied on the channel Matrix H. The decomposition creates two matrixes: an upper triangular with only real-numbers on the diagonal and a unitary matrix. The decomposition simplifies the representation of the distance calculation needed for constellation points search. An exhaustive search for all the points in the constellation for two spatial streams t(1), t(2) is performed, searching all possible transmit points of (t2), wherein each point generates a SISO slicing problem in terms of transmit points of (t1); Then, decomposing x,y components of t(1), thus turning a two-dimensional problem into two one-dimensional problems. Finally searching the remaining points of t(1) and using Gray coding in the constellation points arrangement and the symmetry deriving from it to further reduce the number of constellation points that have to be searched.

5 Claims, 5 Drawing Sheets

REDUCING COMPUTATIONAL COMPLEXITY IN MAXIMUM LIKELIHOOD MIMO OFDM DECODER

FIELD OF THE INVENTION

The present invention relates to wireless communication systems and more specifically, to maximum-likelihood decoders for high throughput wireless communication systems.

BACKGROUND OF THE INVENTION

Achieving high throughput (over 100 Mbps) in wireless communication systems has been an ongoing challenge in recent years. One of the established solutions is to use a plurality of transmit and receive antennas, a technology known as multiple-inputs multiple-outputs (MIMO). Advantageously, MIMO enables a significant increase in throughput and range of a wireless communication system, without any increase in bandwidth or overall transmission power expenditure. This is achieved by increasing the spectral efficiency (the number of information bits that can be transmitted per second of time and per Hertz of bandwidth) of a wireless communication system by exploiting the space domain (since multiple antennas are physically separated in space). MIMO is sometimes used in conjunction with orthogonal frequency multiplexing modulation (OFDM) that eliminates undesired side effects such as inter symbols interference (ISI) and fading channels.

FIG. 1 shows the general structure of a typical MIMO OFDM system according to the prior art. The MIMO transmitter 100 has multiple antennas 110A-110C each capable of transmitting independent signals to a MIMO receiver 120 which is also equipped with multiple receive antennas 130A-130B. The transmitter 100 may comprise a forward error correction (FEC) code encoder 101, an interleaver 102, a MIMO constellation Mapper 103, an OFDM MIMO modulator (IFFT) 104 and an analog and RF unit 105. The MIMO receiver 120 may comprise an RF and analog unit 121, a MIMO OFDM demodulator (FFT) 122, a MIMO decoder 123 (also known as a slicer), a de-interleaver 124 and a FEC Decoder 125, all of which are used to convert the incoming RF signals into spatial streams representing bits of information sent over the channel. The MIMO decoder (Slicer) receives a plurality of spatial streams of bits, and decodes them into information bits. In some MIMO systems the decoder performs hard decision and delivers final value information bits whereas in other systems the decoder delivers soft output for further soft decoding to be performed in a Viterbi decoder, low density parity check (LDPC) decoder or the like.

In a MIMO OFDM system, the received signals vector per tone at the fast Fourier transform (FFT) output may be given in the following expression:

$$r = Ht + n \quad (1)$$

wherein r is the received signals vector at a specific tone, H is the known (or estimated) channel matrix (at the same tone) typically containing complex coefficients representing the channel, t is the transmitted signals vector (per tone) and n is the additive noise vector (at that tone). Maximum-likelihood (ML) decoding provides the best performance for MIMO decoding in BER terms. An optimal per bit ML decoder for MIMO OFDM system is the log-likelihood ratio (LLR) decoder, but is very complicated to implement. A good approximation of LLR may be achieved by implementing the LogMax approximation. The LogMax decoder searches over all possible transmit signal vectors t to find the specific vector which minimizes the Euclidean distance d(t) given in the following expression:

$$d(t) = \|r - Ht\|^2 \quad (2)$$

Specifically, for each transmit bit the LogMax algorithm searches the minimum value over d(t) (expression 2) for transmit vectors that assign a value of 0 to this bit and a second time searches a minimum value over d(t) for transmit vectors that assign a value of 1 to this bit. The difference between the two values (up to a scaling factor that is the noise variance) is the LogMax approximation.

In MIMO systems with square modulation, such as quadrature amplitude modulation (QAM), the number of distances calculations becomes exponential and is given in the following expression:

$$M^{2N_T} \quad (3)$$

wherein $M^2$ is the number of points in the constellation and $N_T$ is the number of spatial streams. It is clear therefore that the complexity of LogMax decoder has to be reduced in order to be used in any practical application such as real-time communication systems.

Various attempts to deal with the high complexity challenge of ML MIMO decoding are known in the art. Most notably, US patent Application No. 20050249302 which is incorporated by reference in its entirety herein, discloses a reduced complexity MIMO-OFDM decoder for receiving and decoding simultaneously a plurality of transmitted signals. Another example is linear decoders which are simple to implement, and are sometimes used as spatial equalizers (i.e. linearly compensating for channel effect on vector of incoming signals prior to decoding). US Patent Application No. US20060092882, which is incorporated by reference in its entirety herein, discloses a MIMO-OFDM decoder that implements LogMax decoder by using zero-forcing ZF spatial equalizer. Another example for a linear decoder known in the art is the ubiquitous Mean-Square Error (MMSE) decoder However, linear decoders suffer from poor performance (in BER terms), specifically in high throughput transmission.

Another approach in MIMO decoding is to perform a non-exhaustive search over some of the constellation points, a method known as sphere decoding. In a sphere decoder the search is performed in a hyper sphere centered in a point x with radius r. Points are searches only in the sphere wherein the radius may be dynamically changed according to predefined parameters. For example, UK Patent No. GB2427106, which is incorporated by reference in its entirety herein, discloses a sphere decoder for MIMO applications with reduced computational complexity decomposition of the channel estimate matrix. However, the complexity of sphere decoding remains high for coded systems and it is also well depended upon signal-to-noise ratio (SNR).

Yet another approach is to simplify at least some of the expressions required in the process of the exhaustive search. For example, Monish Ghosh and Xuernei Ouyang suggest an alternative expression for the Euclidean distance in there article "Reduced-Complexity ML Detection for Coded MIMO Systems Using Absolute-Value Search" published in the International Conference on Acoustics, Speech, and Signal Processing 2005 Vol. 3 pages 1025-1028. Ghosh and Ouyang replace the Euclidean distance expression mentioned above in (2) with an expression which is based upon absolute value calculation that is easier to calculate.

Tradeoff between computational complexity and system performance in ML MIMO decoder poses a real challenge for engineers and it would be advantageous to have a full ML MIMO decoder that has a significantly reduced complexity on the one hand, while retaining its high performance on the other hand.

SUMMARY OF THE INVENTION

The present invention is generally directed to a method and a system for reducing computational complexity in a maximum-likelihood (ML) MIMO OFDM decoder, while retaining high performance.

According to one aspect of the invention, the Euclidean distance expression (the abovementioned expression (2) is transformed into a simpler expression (in complexity terms). This transformation may be achieved by decomposing the channel matrix H into a product of matrices wherein at least one of the matrices may be sparse, upper triangular, triangular or near triangular while the other matrix is a unitary matrix. In some embodiments the transformation is achieved by a QR decomposition wherein H is decomposed into the product of matrix R, an upper triangular matrix with only real-numbers on its diagonal, and Q, a unitary matrix which will be used as a transformation operator. Advantageously, the transformation by a unitary matrix does not change the autocorrelation of the (white spatially) noise, therefore there is no need to modify the autocorrelation matrix for each distance.

According to a second aspect of the invention, an exhaustive search is performed on each and every spatial stream received over the constellation points wherein the search for one of the spatial streams is substantially reduced with no performance degradation. Specifically, the number of constellation points that have to be searched in this spatial stream is reduced from $M^2$ to 2 M wherein $M^2$ denotes the total number of points in a given square constellation. The reduction is achieved due to the quadrature nature of square modulations (i.e. the x and y components of the signal are independent and orthogonal). More specifically, after receiving a first (t1) and a second (t2) spatial streams (in case of two spatial streams) all possible transmit points of the second spatial stream (t2) are scanned wherein each point generates a single input single output (SISO) slicing problem in terms of transmit points of a first spatial stream (t1); Then the x and y components of said first spatial stream are decomposed, turning a two-dimensional problem into two one-dimensional problems; Finally, the remaining points of the first spatial stream (t1) are searched.

According to a third aspect of the invention, Gray coding is used in mapping the constellation before the transmission and upon decoding, a further reduction in the number of distances that has to be calculated may be achieved. This reduction stems from the symmetrical nature of Gray coding in respect to each axis.

BRIEF DESCRIPTION OF DRAWINGS

The subject matter regarded as the invention will become more clearly understood in light of the ensuing description of embodiments herein, given by way of example and for purposes of illustrative discussion of the present invention only, with reference to the accompanying drawings (Figures, or simply "FIGS."), wherein.

Figure 1:
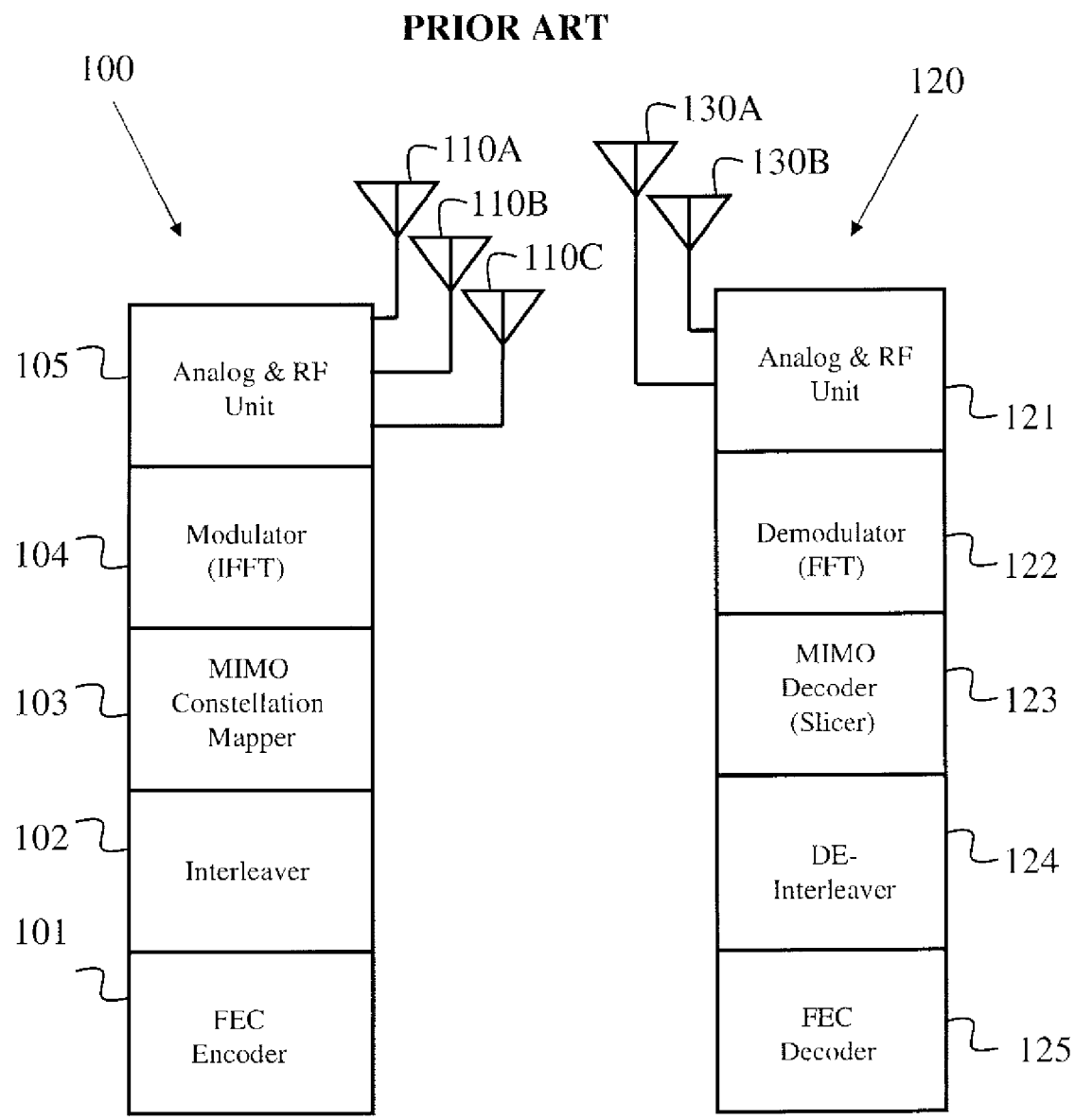
FIG. 1 is a schematic block diagram of a MIMO system according to the prior art.

The drawings together with the description make apparent to those skilled in the art how the invention may be embodied in practice.

Further, where considered appropriate, reference numerals may be repeated among the figures to indicate corresponding or analogous elements.

DETAILED DESCRIPTION OF THE INVENTION

Figure 2:
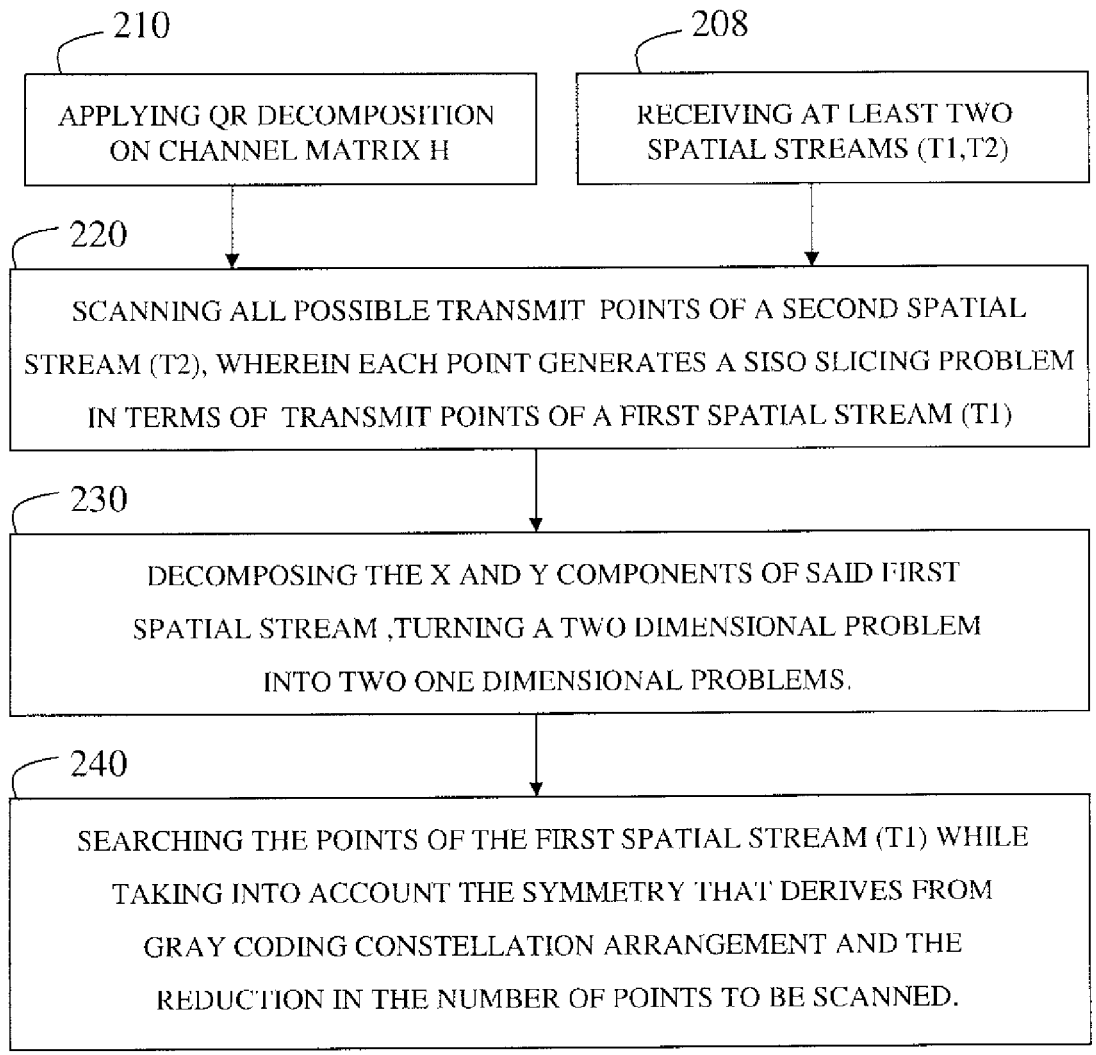
FIG. 2 is a flowchart diagram illustrating an embodiment of the present invention.

FIG. 2 is a flowchart diagram showing the various aspects of complexity reduction as practiced according to the present invention according to some embodiments. Specifically, FIG. 2 refers to the decoding process of two spatial streams. It should become clear that the invention may be practiced with any number of spatial streams (being a function of receive and transmit antennas). In block 208, at least two spatial streams, (t1) and (t2), are received by the decoder (simultaneously). In block 210, the channel matrix H is decomposed into a first matrix R and a second matrix Q. The first matrix R is an upper triangular with real-numbers only on its diagonal, and the second matrix, Q is a unitary matrix. In block 220 all possible transmit points of a second spatial stream (t2) are searched (scanned), wherein each point generates a one dimensional decoding problem (SISO slicing) in terms of transmission points of the first spatial stream (t1). In block 230 the first spatial stream is decomposed into its x and y components, turning a two dimensional problem into two one dimensional problems. Finally, in block 240 the points of the first spatial stream (t1) are searched while taking into account the symmetry that derives from Gray coding constellation arrangement and the reduction in the number of points to be scanned. In both steps 220 and 240 the search employs mathematical expressions, specifically the Euclidean distance as explained below in further details.

Although the invention was designed for wireless application, it may also be applicable to wired (wire-line) MIMO systems. The decoder may be applicable to any number and type of receive and transmit antennas and for other communication methods, such as CDMA and the like.

Achieving Reduction in Complexity Using a Linear Transformation

According to some embodiments of the invention the Euclidean distance given in the above mentioned expression 2 is transformed by means of linear transformation into a simplified expression with reduced complexity. Such transformation may be achieved by applying QR decomposition on the channel matrix H. In QR factorization (decomposition) and using matrix R as a linear transformation applied on the expression representing the distance between the transmit points, d(t). Thus, d(t) is transformed into another expression, d'(t) in accordance with the new channel representation which is materially same as d(t) but with reduced complexity.

Following is an example for an implementation of the QR decomposition on a private case. The example shows that the transformed expression for the Euclidean distance has not changed materially and so using it will not degrade the decoder performance. It should be clear that the following example poses no constraints on the generality of the method according to the invention and it may be applied to any number of transmit and receive antennas. The MIMO system according to the following example has three receive antennas and two spatial streams. Therefore the expression for the distance in this case is given in the following expression:

$$d(t)=\|r_{(3)}-H_{(32)}t_{(2)}\|^2 \quad (4)$$

wherein the subscript denotes the dimension of the elements. The QR decomposition factorizes the matrix H and satisfies:

$$H_{(32)}=Q_{(32)}R_{(22)} \quad (5)$$

And $$(Q_{(32)})^\dagger H_{(32)}=R_{(22)} \quad (6)$$

The dagger symbol denotes Hermitian conjugation.

Additionally, $Q_{(32)}$ may be expanded to a 3×3 orthogonal matrix $Q_{(33)}$ satisfying:

$$\left[ H_{(32)} \begin{pmatrix} 0 \\ 0 \\ 0 \end{pmatrix} \right] = Q_{(33)} \begin{bmatrix} R_{(22)} & 0 \\ & 0 \\ 0 & 0 & 0 \end{bmatrix} \quad (7)$$

By multiplying before the norm by the orthonormal transformation Q, the following equations are obtained:

$$d(t) = \quad (8)$$
$$\|Q^\dagger_{(33)}r_{(3)} - Q^\dagger_{(33)}H_{(32)}t_{(2)}\|^2 = \|Q^\dagger_{(33)}r_{(3)} - Q^\dagger_{(32)}H_{(32)}t_{(2)}\|^2 - \|r'_3\|^2 =$$
$$\|r'_{(2)} - R_{(22)}t_{(2)}\|^2 + \|r'_3\|^2 = d'(t) + \|r'_3\|^2$$

wherein R denotes the R matrix (transformation), r denotes the received signal vector and r' denotes the receive signals vector after the R transformation.

$r'_3$ is the third element of $Q^\dagger_{(33)}r_{(3)}$.

Since $r'_3$ is independent of the transmit signal then minimization on d and d' gives identical results.

$$d(t)=\|r_{(3)}-H_{(32)}t_{(2)}\|^2=\|r_{(2)}'-R_{(22)}t_{(2)}\|^2+Const \quad (9)$$

Therefore, the QR decomposition simplifies the required computations needed in finding the minimal distance for each point, while retaining the same performance in term of detection likelihood. Moreover, the QR decomposition reduces the matrix to the number of spatial streams (nSS) which may be a smaller number than the number of receive antennas (nRx) therefore another reduction in complexity. Yet another reduction derives from the sparse nature of R as the QR decomposition also zeros out lower diagonal parts of the matrix R as well as the imaginary part of the diagonal element of the matrix R.

Specifically, the reduction of the computational complexity due to the zeroing of the imaginary components. By using the properties of the matrix R explicitly in the general expression for d(t) the simplified form of d(t) is given in the following equations:

$$\min_{t_2}\left(|r'_2 - R_{22}t_2|^2 + \min_{t_1}|r'_1 - R_{11}t_1 - R_{12}t_2|^2\right) = \quad (10)$$
$$\min_{t_2}\left(|r'_2 - R_{22}t_2|^2 + \min_{t_{1r}}(|r'_{1r} - (R_{12}t_2)_r - R_{11}t_{1r}|^2) + \min_{t_{1i}}(|r'_{1i} - (R_{12}t_2)_i - R_{11}t_{1i}|^2)\right)$$

Achieving Reduction in Complexity by Exploiting Quadrature Modulations Properties Returning to FIG. 2, block 220 denotes that after receiving both spatial streams, the disclosed decoder performs a full (naïve) scan of all the possible transmit points of the second spatial stream (t2). In this scan, each point generates a single-input single-output (SISO) decoding (slicing) problem in terms of transmit points of a first spatial stream (t1). This can be achieved because the lower diagonal elements of R are zero. Then, as appears in block 230 the x and y components of said first spatial stream are decomposed, turning a two-dimensional problem into two one-dimensional problems. As a result, the point that have to be searched in t(1) are in one column and one row. The x-y decomposition is possible due to the geometry of quadrature modulation wherein the basic signals on the signal space are orthogonal (in quadrature with each other) and also due to the fact that the diagonal element $R_{11}$ is real.

Relying upon the geometry of QAM and other square modulation (quadrature) reduces therefore the complexity of the search over the first spatial stream from approximately $M^2$ to 2M. It should be noted the invention may be applied to any number of spatial streams, wherein only the search of one spatial stream (after conducting a naïve search on all the others) may be reduced significantly as explained above.

Hardware Implementation of the Decoder

Figure 3:
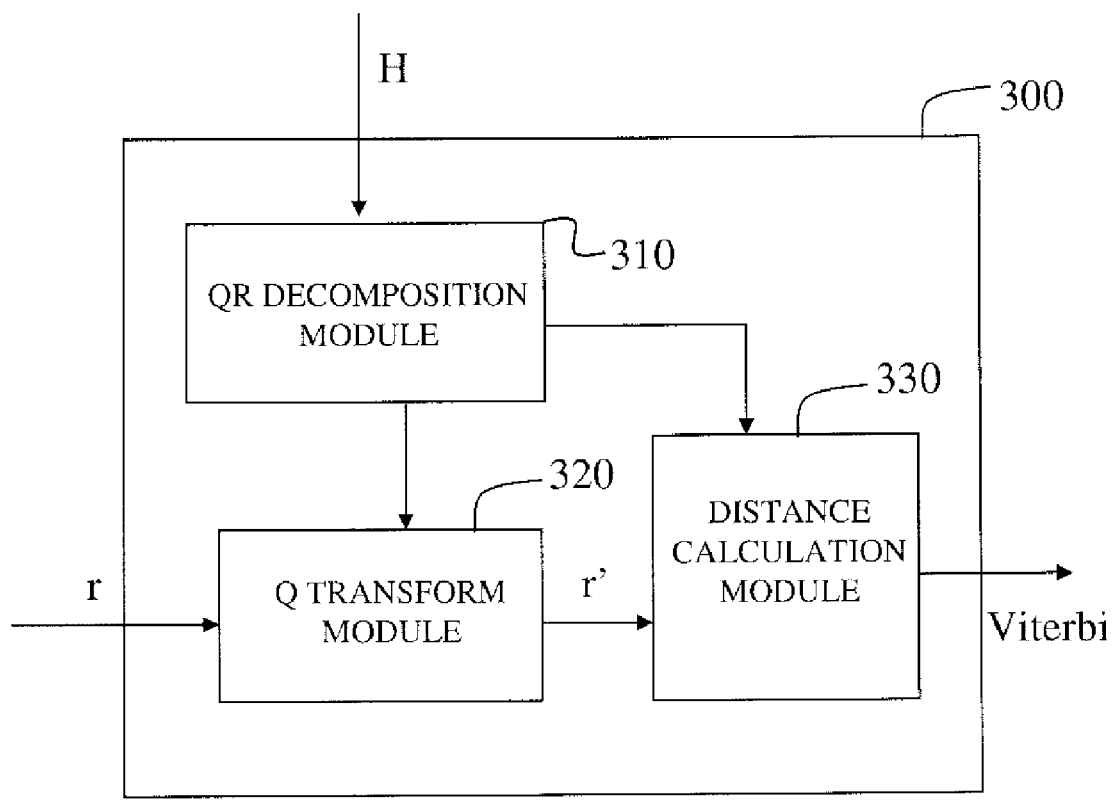
FIG. 3 is a schematic block diagram showing the decoder according to the present invention.

The MIMO decoder may be implemented in hardware in many ways. Clearly, best performance is achieved in application specific integrated circuit (ASIC) technology. However, the invention may be implemented by a digital signal processor (DSP), a designated field programmable gate array (FPGA) or any software. FIG. 3, shows a simplified block diagram of a hardware embodiment of the present invention. The MIMO decoder 300 comprises three modules. The first module is the QR decomposition module 310 which conducts matrix factorization, The second module is the Q transform module 320 which performs the actual linear transformation (deriving from the QR decomposition). It transforms r into r'. The third module is the distance calculation module 331) which calculates the two shortest distances for each bit for every bit value. Thus, the distance calculation module 330 presents the pair of points with the minimal Euclidean distance between them. The distance calculation module exploits the sparse nature of the channel matrix after the factorization has been conducted to minimize the number of operations to find the distances. These distances are used to generate a soft bit for the Viterbi decoder or the like but they may also provide a hard decision value. The output of QR decomposition module 310 is coupled to the input of the Q transform module 320 and to the input of the distance calculation module 330. Further, the output of the Q transform module 320 is coupled to the input of the distance calculation module 330 the output of which may be connected to a Viterbi decoder or the like.

Figure 4:
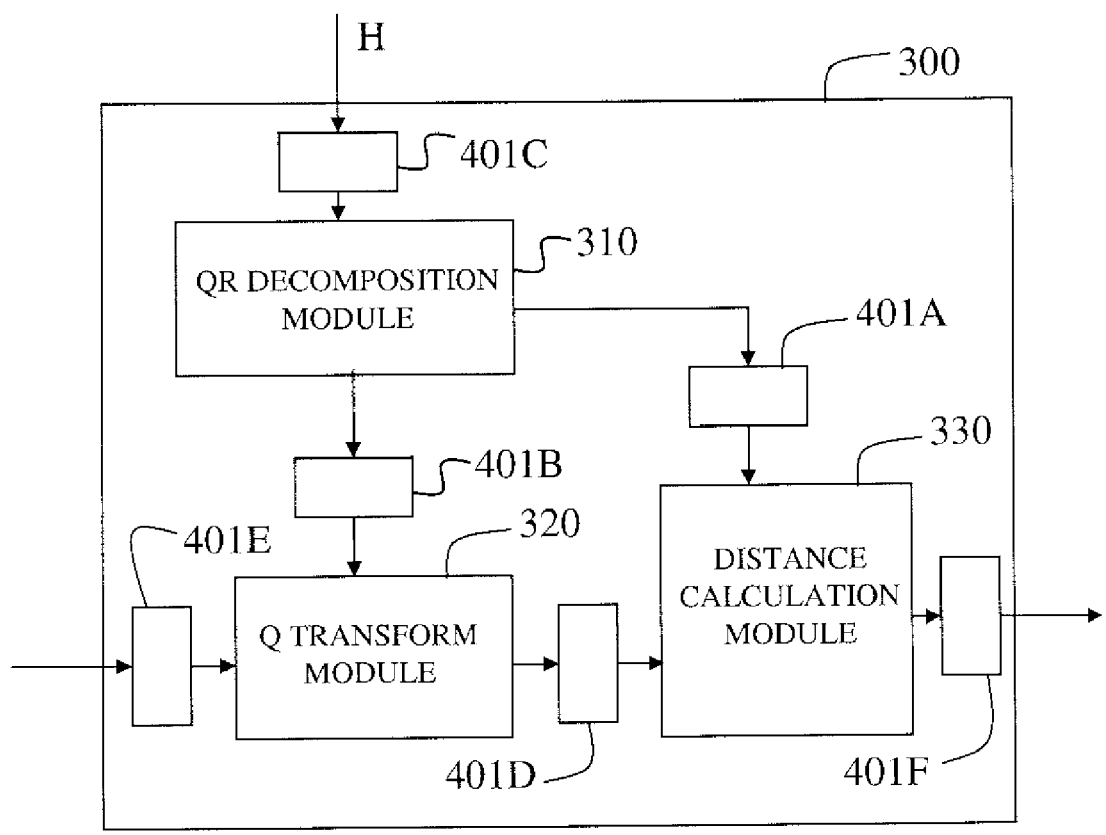
FIG. 4 is a schematic block diagram showing in further details an embodiment of the decoder according to the present invention.

FIG. 4 shows a schematic block diagram according to some embodiments of the invention. In order to achieve the demanding performance required by a multi antenna system, several shift modules 401A-401F may be added to allow amplification of signal where possible. These elements are known as shift modules, re-shift modules and shift control modules. All of the shift modules are coupled between the decoder's modules: QR decomposition module 310, Q transform module 320 and the distance calculation module 330.

According to other embodiments of the invention a high degree of parallel computing and hardware reuse is offered. For example, the QR factorization is implemented with one long pipeline for all carriers. The same hardware is used for the calculation of the QR factorization of the channel matrix H and for transforming the input vector r to $Q^\dagger r$. In addition, the same hardware is reused for different dimensions of the matrix H. Similarly, the search is implemented by parallel machines running—each machine scanning one point from the first spatial stream per clock handling it in one pipeline. Moreover, the MIMO decoder offers a reuse of the same hardware for update stage and decodes stage as well as for different matrix sizes.

Achieving Further Reduction in Complexity by Exploiting Gray Coding Properties

According to other embodiments of the invention, further reduction in the computational complexity of the decoding process is achieved by exploiting Gray coding properties according to a predefined decoding scheme. According to these embodiments, the mapping of bits into symbols on the constellation is performed using Gray code, where a symmetry along the zero axis characterizing Gray code configuration and further reducing the computational complexity of the decoding process.

The following is an example for complexity reduction using Gray code. In the case of binary phase shift keying (BPSK) there are only 2 points and the constellation is one dimensional. For higher order of constellations there is always an even number of hits per symbol (QPSK, 16 QAM, 64 QAM, 256 QAM) therefore half of the bits determine the x value and half of the bits determine the y value. The mapping of each axis is naturally a mapping from bits to 1d symbols. The combination of the mapping of x-axis and the mapping of y-axis determines the 2d symbol.

The mapping of each axis may be defined in the iterative procedure described below. The following is a table showing the initial step of the Gray code mapping:

| Bit Value | Symbol map_1(x) | (11) |
|---|---|---|
| 0 | −1 | |
| 1 | 1 | |

After the initial step, an iterative step may be performed. Given that k bits have already been mapped at a certain point, the mapping of k+1 bits is summarized in the following table:

| word value | Symbol map_k+1(x) | (12) |
|---|---|---|
| 0x | map_k(x)−$2^k$ | |
| 1x | −map_k(x)+$2^k$ | |

The iterative mapping is performed as follows: The mapping for the k lower bits maps k and defines the k+1 mapping using that map and the added most significant bit (MSB). k+1 represent either word 0x or 1x where x is the k-bit word that represents the lower least significant bits (LSBs).

According to some embodiments of the invention, the above-mentioned iterative structure may be exploited to reduce the number of points that are scanned for Log Max calculation. The following is an example illustrating how the number of points to be scanned is being reduced. In the following table the 8 point mapping is provided:

| b3 | b4 | b5 | symbol | (13) |
|---|---|---|---|---|
| 0 | 0 | 0 | −7 | |
| 0 | 0 | 1 | −5 | |
| 0 | 1 | 1 | −3 | |
| 0 | 1 | 0 | −1 | |
| 1 | 1 | 0 | 1 | |
| 1 | 1 | 1 | 3 | |
| 1 | 0 | 1 | 5 | |
| 1 | 0 | 0 | 7 | |

For example purposes, the received points are assumed to be 3.9. The following table summarizes the closest point for each bit:

| bit | value 0 | value 1 | (14) |
|---|---|---|---|
| b3 | −1  010 | 3  111 | |
| b4 | 5  101 | 3  111 | |
| b5 | 1  110 | 3  111 | |

Figure 5:
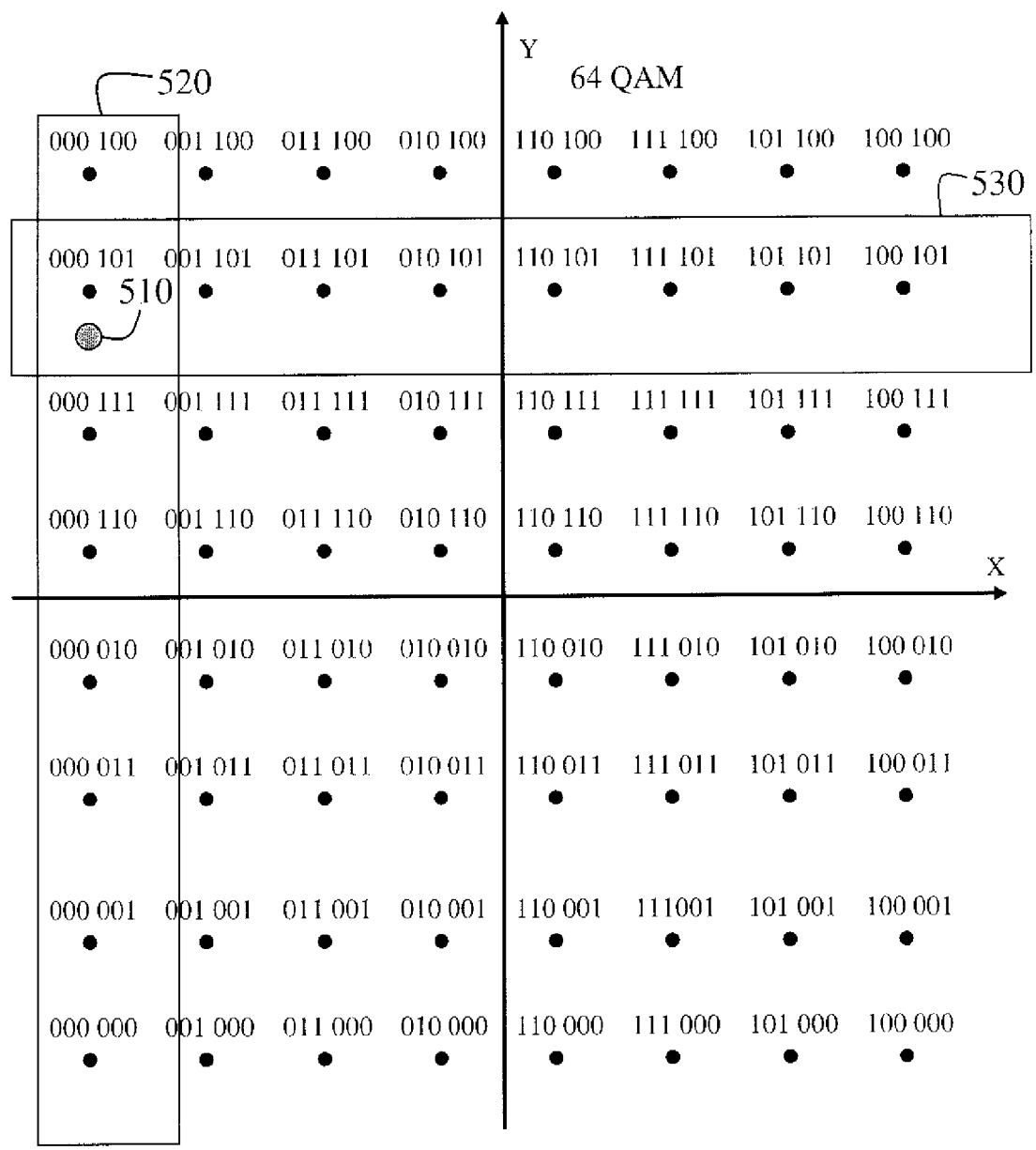
FIG. 5 is a diagram showing a 64 QAM constellation map as may be applicable to the invention.

FIG. 5 shows the relevant points of $t_1$ on a 64 QAM constellation map, wherein the receive point is marked as 510. The reduction of the entire search plane into one column 520 and one row 530 has become possible due to expression (10) which is a valid expression due to the QR decomposition and the constellation geometry, as has been explained in details above. In 64 QAM, the search on $t_1$ is reduces from 64 to 15 points.

Now, the distances may be found (but not necessarily the points) by the following iterative procedure, which substantially reverses the construction of the Gray code:

(a) receive point and set at stage k+1 by x.

(b) if x>0 then the closest point for the LSB is with value 1. The point is not known yet but it will be the closest point calculated at the end of the process. The other distance is the distance to the point with LSB bit 0. This point must be the point −1 (as all points with LSB that is zero are negative and −1 is the closest to 0). So the distance for value '0' for bit k+1 is x+1. Now $2^{k-x}$ may be performed and apply the decoding with stage k for k bits.

(c) if x<0 then the closest point for the LSB is with value 0. The point is not known yet but it will be the closest point calculated at the end of the process. The other distance is the distance to the point with LSB bit 1. This point must be the point 1. So the distance for value '1' for bit k+1 is −x+1. Now $2^{k+x}$ may be performed and apply the decoding with stage k for k bits.

(d) When there is only 1 bit left the distance to the second is again |x|+1 as in the previous stages. The value for this bit is determined by the sign of x. However, the closest point is also found at a distance 1−|x|. This distance is valid for all bits. This can be performed also as stage 0.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description below.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention can be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the embodiments. Those skilled in the art will envision other possible variations, modifications, and applications that are also within the scope of the invention. Accordingly, the scope of the invention should not be limited by what has thus far been described, but by the appended claims and their legal equivalents. Therefore, it is to be understood that alternatives, modifications, and variations of the present invention are to be construed as being within the scope and spirit of the appended claims.

What is claimed is:

1. A method comprising:
   receiving at least a first and a second spatial streams of transmit points, each spatial stream being associated with a transmitting antenna, over a multiple input multiple output (MIMO) channel associated with a channel matrix H, wherein the transmit points are modulated based on a square modulation associated with a square constellation of points defined by x and y components respectively;
   performing a naïve search of all possible transmit points of the second spatial stream by generating, for each transmit point of the second spatial stream, a single-input single-output (SISO) decoding problem in terms of transmit points of the first spatial stream;
   decomposing the x and y components of the points of the first spatial stream based on the naïve search, thus creating two one-dimensional problems from each two-dimensional decoding problem; and
   performing a reduced search of the transmit points of the first spatial stream, wherein the reduced search is performed for each point only along a single column and a single row associated with the decomposed x and y components respectively.

2. The method according to claim 1, further comprising applying a linear transformation R to the received spatial streams, wherein R is generated by a QR decomposition of the channel matrix H, and wherein Q is a unitary matrix.

3. The method according to claim 2, wherein R is an upper triangular matrix having real numbers only on its diagonal.

4. The method according to claim 3, wherein the search of the transmit points is carried out by calculating a number of transformed Euclidean distances generated by applying the linear transformation R to respective standard Euclidean distances, and wherein the transformed Euclidean distances exhibit a reduced complexity than the respective standard Euclidean distances.

5. The method according to claim 4, wherein the square modulation is based upon Gray code mapping, configured such that the number of the transformed Euclidean distances required for each search is reduced.

* * * * *